United States Patent Office 3,335,089
Patented Aug. 8, 1967

3,335,089
HYDROGEN-EMBRITTLEMENT-INHIBITION WITH PROPARGYL BENZYLAMINE AND ALKYL PYRIDINES
George Davidowich, Bayonne, and Morton W. Leeds, Murray Hill, N.J., assignors to Air Reduction Company, Inc., New York, N.Y., a corporation of New York
No Drawing. Filed Apr. 15, 1964, Ser. No. 360,097
4 Claims. (Cl. 252—148)

This invention relates to the prevention of hydrogen embrittlement in the treatment of ferrous metals with aqueous acidic solutions, and is more particularly concerned with the provision of an acidic aqueous solution inhibited against hydrogen embrittlement by reason of the inclusion in the solution of a hydrogen embrittlement inhibitor.

In the treatment of ferrous metals, i.e., iron, steel and other ferrous alloys, such as in metal cleaning operations, or in pickling operations, to remove rust, grease, scale, or other undesired surface materials or coatings from the metal, e.g., in aqueous sulfuric acid solutions, the problem of hydrogen embrittlement is encountered. As stated by Dr. Carl A. Zapffe in an article entitled, "The Behavior of Hydrogen in Steel During Pickling" (Wire and Wire Products, February 1946, pages 149–157), hydrogen embrittlement of steel is a problem of long standing in plants using either acid or cathodic pickling, and hydrogen embrittlement is defined as the trapment under high pressure of hydrogen gas within the microscopic voids that traverse the interior of each grain of the metal. These voids, once congested sufficiently with the gas, place the grain under three dimensional stress, which precludes slip and plastic movement. The metal is then embrittled. As stated in the foregoing article, the tremendous quantity of hydrogen that steel may occlude within its microscopic voids is demonstrated by the pickling of a steel wire in sulfuric acid, followed by careful rinsing and drying, and subsequent immersion of the wire in deaerated hot water. The wire, upon immersion, produced a violent evolution, with the bubbling continuing visibly for 10 minutes.

It is customary in pickling, metal cleaning, and like operations to include in the aqueous sulfuric acid solution a corrosion inhibitor to prevent or retard attack by the acidic solution upon the metal being treated, and such corrosion inhibitors are commonly used in pickling and related metal treating operations. However, as discussed by Zapffe et al. in a series of three articles entitled, "Evaluation of Pickling Inhibitors from the Standpoint of Hydrogen Embrittlement," which appeared at pages 933–939; 1048–1053, 1080–1082; and 1126–1130, 1172–1175; of "Wire and Wire Products," vol. 23 (1948), the great majority of compounds which act as corrosion inhibitors and are sold commercially for this purpose do not prevent hydrogen embrittlement and, indeed, actually promote and increase hydrogen embrittlement. In other words, the hydrogen embrittlement observed when these corrosion inhibitors are used is greater than that observed when the same metal is pickled under identical conditions in the raw sulfuric acid solution.

There is, therefore, an important need for hydrogen embrittlement inhibitors because the usual corrosion inhibitors cannot be relied on for this purpose.

It is, accordingly, an object of this invention to provide a hydrogen-embrittlement inhibitor which is effective in aqueous sulfuric acid solutions to prevent hydrogen embrittlement of ferrous metals immersed in it.

It is a further object of the invention to provide an inhibited aqueous sulfuric acid solution suitable for the treatment of ferrous metals without hydrogen embrittlement.

It is a still further object of the invention to provide a method of preventing hydrogen embrittlement in the treatment of ferrous metals with aqueous sulfuric acid solutions.

These and other objects of the invention are achieved by the incorporation in an aqueous sulfuric acid solution of a small but effective hydrogen-embrittlement-inhibiting amount of propargyl benzylamine and an alkyl pyridine.

Propargyl benzylamine is a compound of the formula $C_6H_5CH_2NHCH_2C\equiv CH$ and is conveniently prepared by interacting propargyl bromide of the formula

$$BrCH_2C\equiv CH$$

and benzylamine, e.g., by the procedure described by Von Braun et al. in Berichte der Deutschen Chemischen Gesellschaft, vol. 59 (1926), pp. 1081–1090, or the procedure described by Wolf in Annalen der Chemie, vol. 576 (1952), pp. 35–45, or the procedure described in British Patent 906,245.

The alkyl pyridine suitably used in accordance with this invention is a lower-alkyl pyridine such as methyl pyridine, ethyl pyridine, propyl pyridine, and the like. Alkyl pyridines are available commercially as mixtures or fractions, generally predominating in methyl pyridine (picoline). Typical commercial alkyl pyridines are Alkyl Pyridine HB, available from Union Carbide Corp., and Pickling Compound No. 53, available from Allied Chemical Corp.

The introduction of the above-described combination of acetylenic compounds in aqueous sulfuric acid solutions has been found to have the desirable result of inhibiting or substantially preventing hydrogen embrittlement of ferrous metals immersed in the solution.

The use of the above-described specific combination of acetylenic compounds as a hydrogen-embrittlement inhibitor in aqueous sulfuric acid solutions is advantageous in that its inhibiting action is effective over a wide and useful concentration range. This inhibitor combination has the further advantage that it is effective even at very low concentrations in the acidic solutions. A further advantage of this inhibitor combination is that it may be used at elevated temperatures to provide good hydrogen embrittlement inhibition and even under these conditions it is effective in very low concentrations.

The most effective amount of the inhibitor combination of this invention to be used can vary, depending upon local operating conditions. Thus, the temperature and other characteristics of the aqueous acid system may have a bearing upon the amount of inhibitor to be used.

In general, however, it has been found that a concentration of the combination of propargylamine and an alkyl pyridine between 0.01% to 0.1% by weight of the aqueous sulfuric acid solution is an effective hydrogen-embrittlement-inhibiting concentration, with a concentration between 0.01% to 0.05% being particularly advantageous even for aqueous sulfuric acid systems at elevated temperatures, e.g., in the neighborhood of 80° C. The sulfuric acid solution can be dilute or concentrated and can be of any of the concentrations used in treating ferrous metals, e.g., 5 to 80%. The ratio of the two components can vary but preferably the ratio is 2:1 to 1:2, with a 1:1 ratio being especially preferred.

The following specific examples are illustrative of the corrosion inhibiting properties of the inhibitor combination of the invention. In the examples, the inhibitor concentration is expressed as a percent by weight of the aqueous acidic solution in which it is incorporated, and Alkyl Pyridine HB is used as the alkyl pyridine.

The method used to determine the hydrogen-embrittlement-inhibiting properties of the inhibitor combination of the invention as set forth in the following examples is that developed by Zapffe (Transactions American Institute of Metallurgical Engineers, Iron and Steel Div., vol. 167, pp. 281–282; 1946) which depends upon the bending or breaking of a piece of wire which is bent around a constant radius through 180° at a constant rate. The rate of bending is 4.5° per second, which is rapid enough to prevent significant recovery from escaping hydrogen during bending, but not too rapid to allow reading of the breaking angle.

Wire specimens 4 in. long cut from Arcrod No. 1 stainless steel 430 welding wire (1/16 in. diameter) were used in the tests. The specimens were cleaned with 400S emery cloth. The clean specimens in duplicate were placed in a jar which contained 100 ml. of 4.8 N sulfuric acid, plus the inhibitor. The jars were placed in a constant temperature oven and heated for 15 min. at 80° C. The specimens were then removed, rinsed in water, dried, and the angle of bend determined. The bend angle indicated in the table below is an average of at least four specimens.

Example 1

The following test results illustrate the hydrogen-embrittlement-inhibiting properties of the combination of equal parts of propargyl benzylamine and an alkyl pyridine (HB). Using the procedure described above, stainless steel wire specimens were immersed in 4.8 N sulfuric acid at 80° C. (176° F.) for 15 minutes with the total inhibitor concentration being 0.01% of the acidic solution.

Inhibitor
concentration:  Bend angle
0.01% _____ No breaking at maximum angle.
None (control) __ Broke at 45°.

Example 2

Using the procedure described above, propargyl benzylamine and the alkyl pyridine used in Example 1 were tested individually for their hydrogen-embrittlement-inhibiting characteristics.

| Inhibitor | Inhibitor Concentration, Percent | Bend Angle, Degree |
|---|---|---|
| Propargyl benzylamine | .05 | Broke at 80. |
| Alkyl pyridine (HB) | .01 | Do. |

It will be understood that various changes and modifications may be made in the foregoing description without parting from the scope of the invention, as defined in the appended claims and it is intended, therefore, that all matter contained in the foregoing description shall be interpreted as illustrative only and not as limitative of the invention.

We claim:
1. An aqueous solution of sulfuric acid containing an effective hydrogen-embrittlement-inhibiting amount of propargylbenzylamine and a lower alkyl pyridine in the ratio of about 2:1 to 1:2.
2. An aqueous solution of sulfuric acid containing 0.01 to 0.5% by weight of the solution of propargylbenzylamine and a lower alkyl pyridine in the ratio of about 2:1 to 1:2.
3. A method of inhibiting hydrogen-embrittlement of ferrous metals by an aqueous sulfuric acid solution which comprises incorporating in said solution an effective inhibiting amount of propargylbenzylamine and a lower alkyl pyridine in the ratio of about 2:1 to 1:2.
4. A method of inhibiting hydrogen-embrittlement of ferrous metals by an aqueous sulfuric acid solution which comprises incorporating in said solution 0.1 to 0.5% by weight of the solution of propargylbenzylamine and a lower alkyl pyridine in the ratio of about 2:1 to 1:2.

References Cited

UNITED STATES PATENTS

| 3,017,355 | 1/1962 | Oakes | 252—391 X |
| 3,079,345 | 2/1963 | Monroe et al. | 252—390 X |
| 3,107,221 | 10/1963 | Harrison et al. | 252—390 X |
| 3,114,657 | 12/1963 | Stilwell | 252—146 X |

LEON D. ROSDOL, *Primary Examiner.*

W. E. SCHULZ, *Assistant Examiner.*